United States Patent [19]

Baron

[11] 4,364,197
[45] Dec. 21, 1982

[54] PRE-GROWN TURF AND MANUFACTURING OF PRE-GROWN TURF

[75] Inventor: Gerard Baron, Puteaux, France

[73] Assignee: Fitexa S.A., Courbevoie, France

[21] Appl. No.: 239,665

[22] Filed: Mar. 2, 1981

[30] Foreign Application Priority Data

Mar. 11, 1980 [FR] France ............................... 80 05370

[51] Int. Cl.³ .............................................. A01G 1/00
[52] U.S. Cl. ...................................................... 47/56
[58] Field of Search ..................................... 47/56, 62

[56] References Cited

U.S. PATENT DOCUMENTS

| | | | |
|---|---|---|---|
| 2,826,865 | 3/1958 | Chohamin | 47/56 |
| 2,909,003 | 10/1959 | Marshall | 47/56 |
| 2,923,093 | 2/1960 | Allen | 47/56 |
| 2,976,646 | 3/1961 | Hansen et al. | 47/56 |
| 3,766,684 | 10/1973 | Kato | 47/62 |
| 3,863,388 | 2/1975 | Loads | 47/56 |

FOREIGN PATENT DOCUMENTS

| | | | |
|---|---|---|---|
| 2729405 | 4/1978 | Fed. Rep. of Germany | 47/56 |
| 7203670 | 3/1975 | France | |
| 7636574 | 6/1978 | France | |
| 2451699 | 11/1980 | France | 47/56 |
| 510136 | 7/1939 | United Kingdom | 47/56 |

*Primary Examiner*—Robert E. Bagwill
*Attorney, Agent, or Firm*—Arnold, White & Durkee

[57] ABSTRACT

A carpet for providing pre-grown turf or the like is provided. The carpet comprises two layers of non-woven cloth of which at least one of the layers is made substantially from flax fibers. Intermediate the layers of non-woven cloth is a layer of grass seeds.

14 Claims, 4 Drawing Figures

PRE-GROWN TURF AND MANUFACTURING OF PRE-GROWN TURF

The invention relates to a carpet used to obtain pre-grown turf or the like; it also relates to a technique utilized for its manufacturing.

As is known to those skilled in the art, pre-grown turf known also as "sod of turf" is a grassy surface of land forming a kind of carpet, or sid, which is rolled out on soil prepared to receive it. For a certain number of years, some turfs which were pregrown on various subsoils or between two layers of permeable materials were available on the market in many countries. These various turfs had several disadvantages: (1) excessive weight; (2) unsatisfactory degradation when in contact with the soil or the fertilizers added, caused, for example, by the slow process of their degradation or the formation of toxic substances during degradation; and (3) prone to being damaged and pulled out by the cleats or spikes on sport shoes. Exemplary of such turfs are those disclosed in U.S. Pat. Nos. 2,192,939; 2,826,865; 2,923,093; and 2,976,646.

A few years ago, a process called "TANA" was described in French Pat. No. 72-03670 of STUART GOODALL, Ltd. This patent discloses growing turf on a polystyrene powder placed on a pulyurethane sheet floating on water. Turf manufactured by this process remains expensive, requires sizable investments, cannot be mowed when growing, and, from a practical point of view, must be cultivated in greenhouses to prevent rain from flooding the flats (the polyurethane sheets) upon which the turf is cultivated.

French Pat. No. 76-36574, also issued as U.S. Pat. No. 2,372,589, disclosed a technique for growing turf in which a fine compost layer made of crushed bark is cultivated on an impervious surface. The implementation of this technique remains difficult because the subsoil must be prepared on the cultivation site of the turf, and, in addition, this freshly established subsoil tends to be affected by adverse atmospheric conditions. furthermore, the weight of the turf produced still remains high.

By means of the present invention, there is provided a new type of carpet suitable for the proper germination of grass seeds or the like and the satisfactory growing of turf, without any of the above-mentioned problems.

A carpt of turf in accordance with the present invention comprises two layers of non-woven cloth, between which are spread grass seeds or similar seeds. At least one of the two layers of non-woven cloth is mainly made of flax fibers.

Throughout the description and the claims, a "carpet of turf" shall be understood to be a carpet for potential turf, i.e., a carpet containing grass seeds or the like under ideal germinating conditions, as well as a carpet of pre-grown turf or sort of turf. "Turf" shall be understood to describe not only the turf itself, but also all the grassy surface of land whether the grass is used for ornamental purposes and/or for forage. Some of the grass seeds used include ray grass and mixed ray grass seeds, alfalfa, dichondra, etc.

In a preferred embodiment, both layers of non-woven cloth are substantially made of flax fibers. Such fibers are obtained through carding tow of flax. The average staple length ranges between 0.5 and 10 cm ($\frac{3}{4}$ and 4 inches), preferably between 2 and 5 cm ($\frac{3}{4}$ and 2 inches). They are gathered to form a non-woven cloth or carpet to be stitched through in a tufting fashion as described herein. The lower layer preferably weights between 100 and 400 g/m$^2$ (0.328 and 1.311 oz/ft$^2$); the upper one, between 100 and 300 g/m$^2$ (0.328 and 0.983 oz/ft$^2$). These relative positions (lower and upper) obviously depend upon the position of the carpet when placed upon the land to be turfed. These (lower and upper) basic layers are stitched together in a tufting fashion to facilitate their handling.

It is also possible to use other types of fibers in conjunction with the flax fibers to form the non-woven cloth layers, as long as the proportion of other types of fibers does not exceed 50% of the weight of flax fibers.

Common and uncommon types of fibers may be used. However, in order to reduce the cost, rejects from flax fibers affected by ret or short fibers of flax which cannot be used for classic weaving operations are preferable.

It is also possible to construct a carpet with one of the cloth layers not made of flax but made of various synthetic fibers, whether artificial or natural. Exemplary of such fibers are the following: polyesters which may be photodegradable, polypropylene, polyamides, hemp, or fibers resulting from fibrillation. Pepper-and-salt cloth, i.e, cloth formed from fibers which are rejects from various operations in the textile industry, provides a good substitute. For example, pepper-and-salt cloth may be used for the lower layer if its weight ranges between 100 and 300 g/m$^2$ (0.328 and 0.983 ox/ft$^2$), or for the upper layer if its weights ranges between 100 and 200 g/m$^2$ (0.328 and 0.656 oz/ft$^2$). The fibers in this case have a length comparable to the length of the flax fibers. The layer basically made of flax fibers shall preferably be lower position.

In a variation, the non-flax layer may be a non-woven sheet produced by a paper manufacturing process, a mesh network, or even a perforated, water-soluble film.

The seeds are spread evenly between the two layers of non-woven cloth at a rate of about 5 to 50 g/m$^2$ (0.016 to 0.164 ox/ft$^2$), depending upon the desired results and especially according to the mixture and variety of seeds utilized. For example, a rate of 7–10 g/m$^2$ (0.023–0.033 oz/ft$^2$) may be used for meadow grass while a rate of 30 g/m$^2$ (0.098 oz/ft to 45 g/m$^2$) may be used for ray grass.

The process comprises scattering these seeds upon the lower layer by utilizing mechanical means, such as a seeder or any other equivalent means.

In order to ensure the proper development of the plantlets, and especially to provide an adequate aeration for the seeds, marbles of an inert substance may be inserted between the two non-woven layers of cloth. In a preferred embodiment, marbles having a 0.5-3 mm (0.02-0.118 inch) diameter are selected, and used at a rate of 50 to 500 cm$^3$/m$^2$ (0.283 to 1.417 in$^3$/ft$^2$) of turf area. The marbles may be made of polystyrene. Expanded polystyrene marbles are preferable. The addition of these marbles produces significant heat control and provides adequate insulation of the layer containing the seeds, and therefore reduces the temperature variations by slowing down the effect of the ambient air.

In a preferred embodiment, the assembly of the two layers of cloth with an intermediate layer containing the seeds, and the marbles if used, is tufted, that is, some of the fibers of the layers of cloth are pulled out with a bearded needle, then driven in and drawn perpendicularly to the general plane of the carpet, through the intermediate layer and through at least part of the outer layer of cloth. The intermediate layer is therefore trapped and kept in place between the two layers of non-woven cloth. The thickness of the whole carpet, once folded and doubled up, as disclosed herein, ranges preferably between 0.5 and 2 cm (0.2 and 0.79 inches).

The carpet, basically made of flax and constructed in the aforementioned fashion, offers several advantages, among which is the advantage of constituting a subsoil sufficiently strong enough to withstand the rough handling and pulling to which the carpet is subjected. Another advantage is that its degradation process is sufficiently long enough to last through the initial growth of the turf. Still, another advantage is the fact that, when decaying, the carpet only releases substances which have a fertilizing effect on the young plants and/or which are not toxic. Furthermore, the carpet of the present invention provides the advantage of enabling the retention of an adequate quantity of water to ensure proper germination of the seeds, even on sloping ground.

This carpet is prepared preferably by means of two separate carding machines which break out the tow and subsequently distribute the fibers, by means of another reliable system, to feed them between the two mobile elements of a napper. Each one of the layers of cloth is folded several times and doubled up until the desired thickness is achieved. The seeds and marbles are evenly distributed over the upper surface of the lower layer of cloth. The upper layer is then overlaid the intermediate layer of seeds and marbles, and tufting is then performed through the complete thickness of the whole assembly at the rate of 20–50 stitches/cm$^2$ (129–323 stitches/in$^2$).

This carpet containing the seeds may be directly placed over the rowing area after the ground has been graded and a waterproof cover placed over the surface of the ground. Once the carpet is put in place, an adequate supply of water and nutrient minerals is provided to ensure the proper growth of the plants. To that effect, part of the watering should be done with liquid manure. Watering should be sufficient to keep the turf moist, and overwatering should be avoided when the turf is placed on a slightly sloping surface to prevent the nutrients from being washed away.

One of the main characteristics of the invention is the fact that the cultivation is of the hydroponic type, meaning that the plants are grown in nutrient mineral solutions rather than in soil. For this reason, the carpet must be laid over an impervious surface, preferably on a gentle slope having an average gradient of 5° with an incline progressively following the course of the drainage in order to specifically facilitate such drainage without however accelerating it. Thus, this hydroponic type of culture, associated with a pre-seeded layer, ensures the rapid sprouting of the seeds since an accurate control of the intake of nutrients can be achieved.

Such a carpet offers many advantages, among which is its initial dry weight averaging 600 g/m$^2$ (2 oz/ft$^2$). This factor, coupled with the strength of the turf to resist being pulled apart during handling and folding operations, as well as the fact that the seeds are sandwiched between the two layers of cloth, contributes to facilitate rolling, transportation, and installation of the pre-grown turf without requiring any special care. The turf may even be placed on embankments or other steeper slopes. The heat insulation of the marbles provides an adequate environment for the development of the plantlets by moderating the effect of the ambient air. The water retention also permits the flax to slowly and gradually rot.

As mentioned before, it is form the carpet of the present invention, and without any contact with peat moss, or earth that the growth of the turf is achieved. The carpet containing the seeds is laid over a thin waterproof sheet, usually made of polyethylene or some other waterproof material, which extends over a surface of the ground which has been previously graded and prepared. The carpet is periodically, but carefully, watered with water and liquid manure to keep it moist and to avoid washing away the nutrients. The periodicity of the watering operation, of course, depends on the atmospheric and environmental conditions. Five to 30 g (0.18 to 1.06 ounces) of nutrients, as weighed when dry, are estimated to be required per each square meter of turf area per month. With adequate temperature and light conditions, the germination starts within a few days. Mowing may be done after 4 to 5 weeks, and the carpet may be marketed 6 to 8 weeks after the fist watering. Its weight is the 5–8 kg/m$^2$ (1.02–1.64 lb/ft$^2$). It may be rolled up and cut to the desired size, and the plastic waterproof sheet is easily separated from the carpet before or after rolling the turf. The turf once laid on fertile soil continues growing regularly, even after having been in storage or in transit for several days.

The means to implement the invention and the advantages derived therefrom are more clearly illustrated by the following description and appended drawings; however, the scope of the invention shall not be limited to this description which is only given as an illustrative embodiment.

Figure 1:
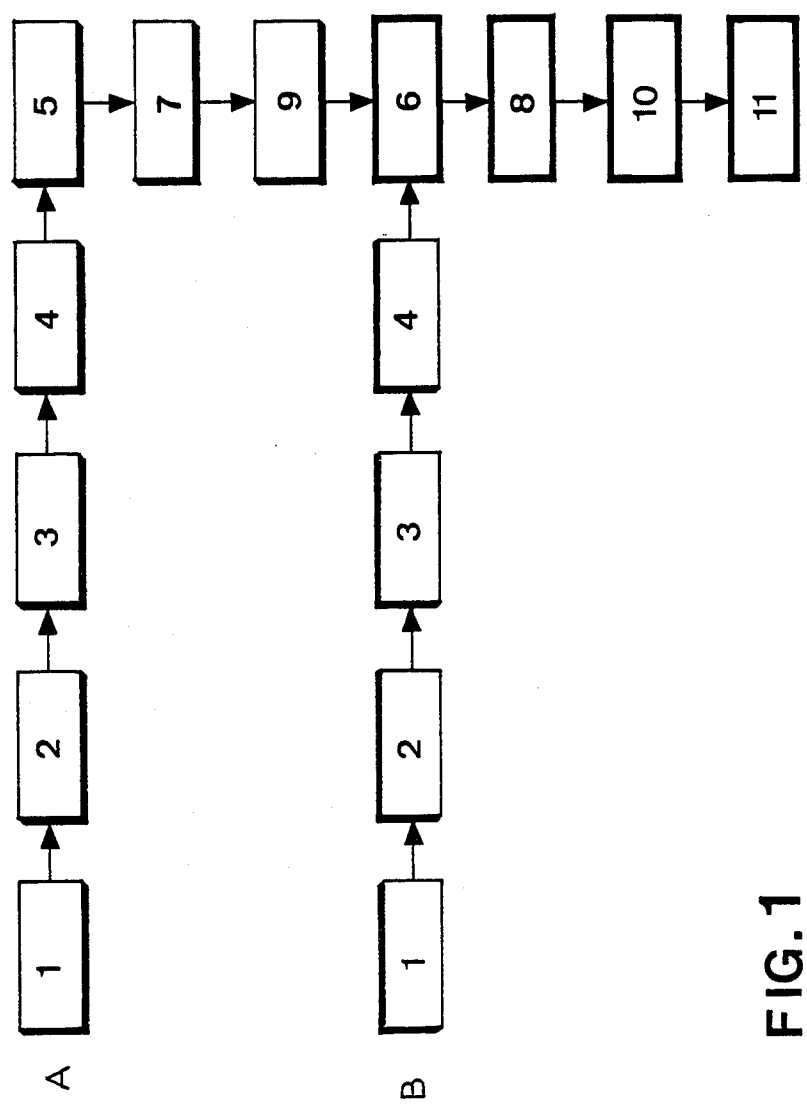
FIG. 1 is a block diagram of the preparation process of a carpet for providing pre-grown turf in accordance with the present invention.

Referring to FIG. 1, the basic equipment used to obtain a carpet for providing pre-grown turf comprises two assembly lines A and B, each one including the following equipment: a cutter 1, an opener 2, a loader 3, and a carding machine 4. A spreader-napper 5 and 6, a bearded needle stitching system 7 and 8, a seeder 9, a cutter 10, and a winder/roller 11 are also provided. Except for the seeder 9, the above equipment is commonly used in the textile industry.

Figure 2:
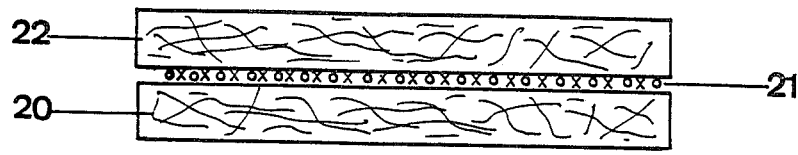
FIG. 2 is an over-simplified sectional view of the carpet of FIG. 1.

In the preferred embodiment, tow of flax is broken out by carding machine 4 and evenly distributed between the two movable elements of napper 5 at a rate of 300 g/m$^2$ (0.983 oz/ft$^2$) for the lower layer of cloth 20 (FIG. 2) and at a rate of 200 g/m$^2$ (0.656 oz/ft$^2$) for the upper layer 22. The flax fibers have an average staple length of 3 to 4 cm (1.18 to 1.57 inches). Each layer of cloth 20, 22 is folded several times and doubled up so that its thickness ranges between 1 and 1.5 cm (0.39 and 0.59 inches). When the layer reaches the desired thickness, it is slightly stitched by stitching system 7. Through seeder 9, an even layer of seeds is spread on the thicker layer of cloth 20 (FIG. 2) in the following respective proportions according to the grass seed variety:

| | | |
|---|---|---|
| *Agrostis penuis:* | 5% | |
| *Festuca rubra:* | 25% | at a rate of 40 g/m$^2$ |
| *Lolium perenne:* | 60% | |

-continued

| Poa pratennsis: | .5% | (0.13 oz/ft²) |
| Cynosurus cristatis: | 5% | |

Figure 3:
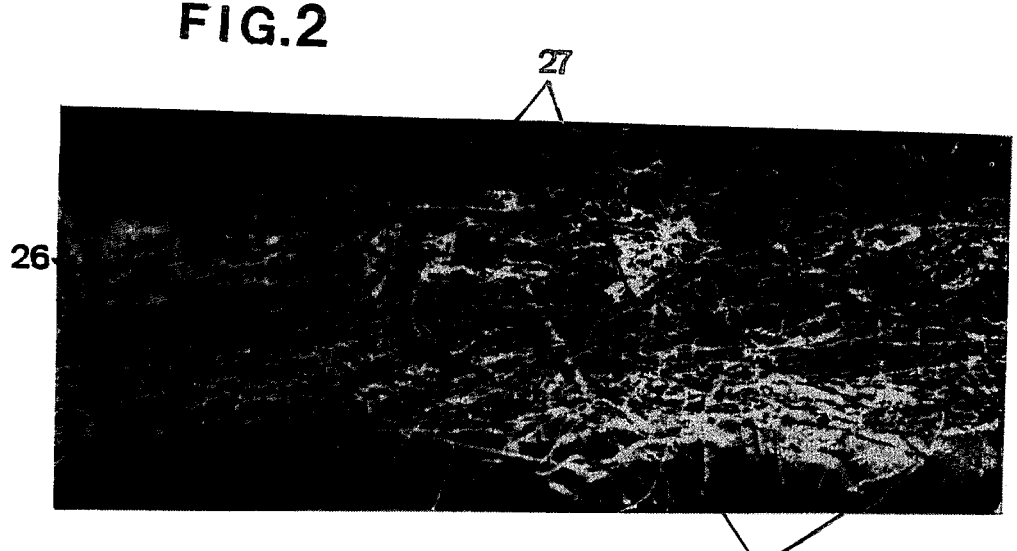
FIG. 3 is an enlarged sectional view of the carpet of FIG. 1.

The thinner layer of cloth 22 is then laid over the layer of seeds, and the whole assembly is then stitched together in a tufting fashion by stitching system 8. The carpet produced weighs about 580 g/m²), and is made of flax fibers 25 (FIG. 3) stitched together as at 27 and having seeds 26 trapped therein.

Figure 4:
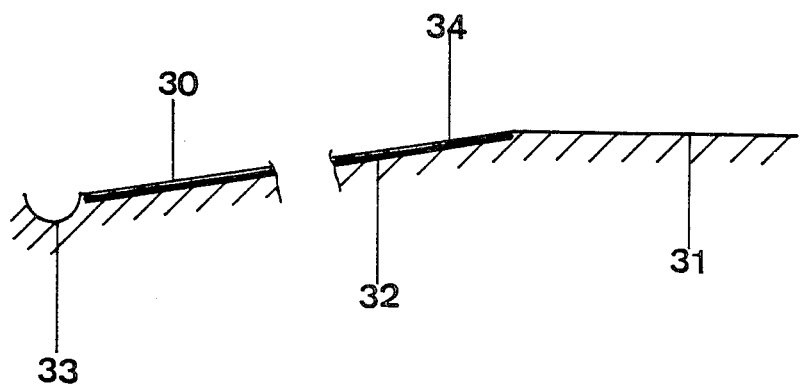
FIG. 4 is an over-simplified sectional view of the configuration for cultivating the carpet of FIG. 1.

Referring to FIG. 4, twenty square meters of carpet 30 are laid on a piece of land previously prepared for this operation. The land area has a center walk 31 for carrying the traffic of the watering equipment (e.g., CETONOR equipment which is a well-known brand in the farming industry). Cultivation platform 32 has been graded in an incline forming an angle of about 4° at the beginning, increasing to 6° towards the base. Piping or drainage system 33 is provided at the base or cultivation platform 32 to collect the liquid used in watering. The platform 32 is protected by a waterproof cover 34, such as a sheet of polyethylene, upon which the carpet 30 is laid. This waterproof sheet 34 is buried into the ground at the top of the incline and is attached to the gutter 33 at the bottom or base of the incline.

Carpet 30 is watered every day in order to be kept moist. Once or twice, this watering is done with fertilizing liquid manure, such as that manufactured by the GESA Company under the brand name of SAINGRAL Irrigation and having the repsective dry weight percentages of 11%/9%/27% for N/P2O5)K20. The total weight of the nutrients added, estimated in dry products, amounts to 20 g/m² (0.065 oz/ft²). the first germination may be observed after 6 days. Five weeks after the first watering, a first mowing is done. After seven weeks, a thick and even turf is produced on the whole platform 32. This pre-grown turf, which weights about 6 kg/m² (1.23 lb/ft²), is then rolled up and delivered upon request. As a comparison, the same size of turf cultivated by the classical technique, and cut in the soil, weighs between 15 and 20 kg/m² (3 and 4 lb/ft²).

The pre-grown turf of the present invention may be laid on graded land prepared to receive the turf. The root system which was growing in water, as described above, now has to grow in soil and quickly adjust to the change. A growth of about 2 cm/48 hours (0.79 in/48 hours) at 12-24° C. (53.5-77° F.) is observed, which is quite unexpected, and ensures a fast and deep growth of the turf.

In an alternate embodiment, expanded polystyrene marbles having an average diameter of 2 mm (0.08 inch) are added to the layer of seeds at a rate of 200 cm³/m² (1.13 in³/ft²). The turf obtained weighs about 650 g/m² (2.13 oz/ft²). This turf has the same characteristics as described above.

In another embodiment of the present invention, meadow grass seeds are spread over the lower cloth layer at a rate of 10 g/m² (0.033 oz/ft²). This carpet is laid over a polyethylene sheet 34 covering a ground graded in a slight incline and treated as described above. Eight weeks after the carpet has been laid on the ground and the first watering has been done, the carpet is separated from the polyethylene sheet and rolled up. Its weight is about 7 kg/m² (1.43 lb/ft²). It is stored, and then carried and laid over level fertile soil, care being taken to provide for proper aeration. The growth of the turf is absolutely even, and, after ten weeks from the beginning of the germination, a heavy treading does not bring any trace of subsoil to the surface.

In still another embodiment, the upper layer of cloth 22 is replaced with a 45 g/m² (0.15 oz/ft²) non-woven textile veil made of cellulose fibers and produced through a paper manufacturing process. In this embodiment the assembly line B and its equipment shown in FIG. 1, can be eliminated, which results in a saving of nearly half of the investment cost, due to the fact that the textile veil can be fed to napper 6 directly from the system from which it emerges.

It is tobe understood that the invention will admit of other embodiments. The above description is given only to facilitate understanding of the invention by those skilled in the art and should not be construed as limiting the invention itself which is defined herein by the appended claims.

It is to be understood that the invention will admit of other embodiments. The above description is given only to facilitate understanding of the invention by those skilled in the art and should not be construed as limiting the invention itself which is defined herein by the appended claims.

What is claimed is:

1. A carpet for providing pre-grown turf, comprising: upper and lower layers of non-woven cloth, at least one of the non-woven cloth layers being substantially made of flax; and a layer of grass seeds spread intermediate the upper and lower non-woven cloth layers.

2. The carpet of claim 1, wherein the upper and lower non-woven cloth layers are both substantially made from flax fibers.

3. The carpet of claim 1, wherein the upper non-woven cloth layer is substantially made of flax fibers and weighs between 100 and 300 g/m².

4. The carpet of claim 1, 2, or 3, wherein the lower non-woven cloth layer weighs between 100 and 400 g/m².

5. The carpet of claim 3, wherein expanded polystyrene marbles are spread intermediate the upper and lower nonwoven cloth layers, the marbles having a diameter between 0.5 and 3 mm and being spread at a rate of 50 to 500 cm³/m² of carpet area.

6. The carpet of claim 4, wherein expanded polystyrene marbles ae spread intermediate the upper and lower non-woven cloth layers, the marbles having a diameter between 0.5 and 3 mm and being spread at a rate of 50 to 500 cm³/m² of carpet area.

7. The carpet of claim 1, 2, 3, or 5, wherein the grass seeds are pre-germinated.

8. The carpet of claim 6, wherein the grass seeds are pre-germinated.

9. A method for preparing a carpet of pre-grown turf, comprising the steps of:
spreading grass seeds intermediate two layers of non-woven cloth at least one of said layers being substantially made from flax fibers; placing the layers on a waterproof cover which is spread over ground having a gently sloping surface; watering the layers with a nutrient solution.

10. The method of claim 9, wherein the waterproof cover is a polyethylene sheet.

11. The method of claim 9 or 10, further comprising the step of tufting the two non-woven cloth layers together after the spreading step.

12. The method of claim 9 or 10, wherein the spreading step further comprises the step of spreading expanded polystyrene marbles intermediate the two non-woven cloth layers.

13. The method of claim 11, wherein the spreading step further comprises the step of spreading expanded polystyrene marbles intermediate the two non-woven cloth layers.

14. The method of claim 9 or 10, further comprising the step of collecting the excess nutrient solution after the watering step.

* * * * *

UNITED STATES PATENT AND TRADEMARK OFFICE
CERTIFICATE OF CORRECTION

PATENT NO. : 4,364,197  Page 1 of 2
DATED : December 21, 1982
INVENTOR(S) : Gerard Baron It is certified that error appears in the above—identified patent and that said Letters Patent is hereby corrected as shown below:

Column 1, line 10, please delete "sid" and insert --sod--.

Column 1, line 41, please delete "further-" and insert
      --Further- --.

Column 2, line 1, please delete "weights" and insert --weighs--.

Col. 2, line 27, "(0.328 and 0.983 ox/ft$^2$)" should read
      --(0.328 and 0.983 oz/ft$^2$)--.

Col. 2, line 38, "(0.016 to 0.164 ox/ft$^2$)" should read
      --(0.016 to 0.164 oz/ft$^2$)--.

Col. 3, line 33, please delete "rowing" and insert --growing--.

Col. 4, line 1, please delete "form" and insert --from--.

Col. 4, line 18, please delete "fist" and insert --first--.

Col. 4, line 19, please delete "the" and insert --then--.

Col. 5, line 9, after "580 g/m2", insert --(1.9 oz/ft$^2$)--.

Col. 5, line 31, please delete "repsective" and insert
      --respective--.

Col. 5, line 32, "N/P205)K20" should read --N/P205/K20--.

Col. 5, line 34, please delete "the" and insert --The--.

Col. 5, line 38, please delete "weights" and insert --weighs--.

UNITED STATES PATENT AND TRADEMARK OFFICE
CERTIFICATE OF CORRECTION

PATENT NO. : 4,364,197

DATED : December 21, 1982

INVENTOR(S) : Gerard Baron

It is certified that error appears in the above—identified patent and that said Letters Patent is hereby corrected as shown below:

Col. 5, line 48, "12-24°C" should read --12-25°C--.

Col. 6, lines 12 through 17 should be deleted.

Col. 6, line 46, please delete "ae" and insert --are--.

Signed and Sealed this

Twenty-second Day of March 1983

[SEAL]

Attest:

GERALD J. MOSSINGHOFF

*Attesting Officer*    *Commissioner of Patents and Trademarks*